US008626980B2

(12) United States Patent
Foster

(10) Patent No.: US 8,626,980 B2
(45) Date of Patent: Jan. 7, 2014

(54) HIGH DENSITY, LOW JITTER, SYNCHRONOUS USB EXPANSION

(75) Inventor: Peter Graham Foster, Parkside (AU)

(73) Assignee: Chronologic Pty. Ltd., Adelaide (AU)

( * ) Notice: Subject to any disclaimer, the term of this patent is extended or adjusted under 35 U.S.C. 154(b) by 68 days.

(21) Appl. No.: 13/320,334

(22) PCT Filed: May 20, 2010

(86) PCT No.: PCT/AU2010/000601
§ 371 (c)(1),
(2), (4) Date: Nov. 14, 2011

(87) PCT Pub. No.: WO2010/132940
PCT Pub. Date: Nov. 25, 2010

(65) Prior Publication Data
US 2012/0059964 A1 Mar. 8, 2012

Related U.S. Application Data

(60) Provisional application No. 61/179,904, filed on May 20, 2009.

(51) Int. Cl.
*G06F 13/14* (2006.01)
*G06F 13/42* (2006.01)
*G06F 13/40* (2006.01)

(52) U.S. Cl.
CPC .......... *G06F 13/4027* (2013.01); *G06F 13/405* (2013.01)
USPC ............................ 710/315; 710/313; 713/400

(58) Field of Classification Search
USPC ......................................................... 710/300
See application file for complete search history.

(56) References Cited

U.S. PATENT DOCUMENTS 5,566,180 A 10/1996 Eidson et al.
6,219,628 B1 * 4/2001 Kodosky et al. .................. 703/2

(Continued)

FOREIGN PATENT DOCUMENTS

WO WO 2006/102184 A1 9/2006
WO WO 2007/092997 A1 8/2007
WO WO 2008/138052 A1 11/2008

OTHER PUBLICATIONS

"Universal Serial Bus Specification," Apr. 27, 2000; pp. 1-622; Revision 2.0.

(Continued)

*Primary Examiner* — Ryan Stiglic
(74) *Attorney, Agent, or Firm* — Oliff & Berridge, PLC

(57) ABSTRACT

A method of providing high density expansion of a USB network, the method comprising: attaching a plurality of USB hubs to adjacent slots in a PXI instrumentation chassis; configuring one of the USB hubs as a primary USB Hub; connecting an upstream port of the primary USB Hub to a USB network; configuring a first downstream port of the primary USB Hub to communicate across a first PXI Local Bus to a first adjacent USB Hub of the USB Hubs other than the primary USB Hub, the first adjacent USB Hub being adjacent to the primary USB Hub; configuring a plurality of other downstream ports of the primary USB Hub to provide expansion of the primary USB Hub; connecting an upstream port of the first adjacent USB Hub to the first PXI Local Bus, wherein the first PXI Local Bus is in the direction of the primary USB Hub; configuring a first downstream port of the first adjacent USB Hub to communicate across a second PXI Local Bus to a second adjacent USB Hub of the USB Hubs other than the primary USB Hub, the second adjacent USB Hub being adjacent to the first adjacent USB Hub; configuring a plurality of other downstream ports of the first adjacent USB Hub to provide expansion of the first adjacent USB Hub; and configuring any other of the USB hubs and the first adjacent USB Hub in like manner.

17 Claims, 3 Drawing Sheets

(56) References Cited

U.S. PATENT DOCUMENTS

| | | | |
|---|---|---|---|
| 6,278,710 | B1 | 8/2001 | Eidson |
| 6,343,364 | B1 | 1/2002 | Leydier et al. |
| 6,665,316 | B1 | 12/2003 | Eidson |
| 6,741,952 | B2 | 5/2004 | Eidson |
| 6,823,283 | B2 * | 11/2004 | Steger et al. ............. 702/127 |
| 6,978,332 | B1 * | 12/2005 | Harris et al. ............. 710/300 |
| 7,165,005 | B2 * | 1/2007 | Steger et al. ............. 702/120 |
| 7,242,590 | B1 * | 7/2007 | Yeap et al. ............. 361/752 |
| 7,251,199 | B2 | 7/2007 | Eidson |
| 7,254,512 | B2 * | 8/2007 | Odom ............. 702/127 |
| 7,366,631 | B2 * | 4/2008 | Steger et al. ............. 702/127 |
| 7,478,006 | B2 * | 1/2009 | Odom ............. 702/127 |
| 7,509,445 | B2 * | 3/2009 | Odom et al. ............. 710/58 |
| 7,512,512 | B2 * | 3/2009 | Foote et al. ............. 702/127 |
| 7,539,793 | B2 | 5/2009 | Foster et al. |
| 7,542,867 | B2 * | 6/2009 | Steger et al. ............. 702/127 |
| 7,881,899 | B2 * | 2/2011 | Steger et al. ............. 702/127 |
| 2003/0040881 | A1 * | 2/2003 | Steger et al. ............. 702/123 |
| 2003/0074489 | A1 * | 4/2003 | Steger et al. ............. 710/1 |
| 2005/0268009 | A1 * | 12/2005 | Tufford et al. ............. 710/100 |
| 2006/0184335 | A1 * | 8/2006 | Odom ............. 702/127 |
| 2006/0190209 | A1 * | 8/2006 | Odom ............. 702/127 |
| 2006/0245133 | A1 * | 11/2006 | Cetrulo et al. ............. 361/91.1 |
| 2007/0217169 | A1 * | 9/2007 | Yeap et al. ............. 361/752 |
| 2007/0217170 | A1 * | 9/2007 | Yeap et al. ............. 361/752 |
| 2007/0233417 | A1 * | 10/2007 | Steger et al. ............. 702/127 |
| 2007/0233418 | A1 * | 10/2007 | Steger et al. ............. 702/127 |
| 2007/0233431 | A1 * | 10/2007 | Steger et al. ............. 702/189 |
| 2007/0245086 | A1 * | 10/2007 | Odom et al. ............. 711/115 |
| 2009/0105985 | A1 * | 4/2009 | Steger et al. ............. 702/127 |
| 2009/0222685 | A1 | 9/2009 | Foster et al. |
| 2010/0030509 | A1 * | 2/2010 | Crain, II et al. ............. 702/123 |

OTHER PUBLICATIONS

"Universal Serial Bus 3.0 Specification," Nov. 12, 2008; Revision 1.0.

International Search Report in International Application No. PCT/AU2010/000601; dated Aug. 24, 2010.

International Preliminary Report on Patentability in International Application No. PCT/AU2010/000601; dated Nov. 22, 2011.

* cited by examiner

HIGH DENSITY, LOW JITTER, SYNCHRONOUS USB EXPANSION

RELATED APPLICATION

This application is based on and claims the benefit of the filing date of U.S. application Ser. No. 61/179,904 filed 20 May 2009, the content of which as filed is incorporated herein by reference in its entirety.

FIELD OF THE INVENTION

The present invention relates to a method and apparatus for providing a synchronization and timing system, with connectivity based on revision three of the Universal Serial Bus (USB) architecture (or USB 3.0), of particular but by no means exclusive use in providing clocks, data acquisition and automation and control of test and measurement equipment, instrumentation interfaces and process control equipment, synchronized to an essentially arbitrary degree in either a local environment or in a distributed scheme.

BACKGROUND OF THE INVENTION

The USB specification up to and including revision 2.0 was intended to facilitate the interoperation of devices from different vendors in an open architecture. USB 2.0 data is encoded using differential signalling (viz. in which two wires transfer the information) in the form of the difference between the signal levels of those two wires. The USB 2.0 specification is intended as an enhancement to the PC architecture, spanning portable, desktop and home environments.

However, USB was user focussed so the USB 2.0 specification lacked a mechanism for synchronising devices to any great precision. Several proposals attempted to address this and other deficiencies. For example, U.S. Pat. No. 6,343,364 (Leydier et al.) discloses an example of frequency locking to USB traffic, which is directed toward a smart card reader. This document teaches a local, free-running clock that is compared to USB SYNC and packet ID streams; its period is updated to match this frequency, resulting in a local clock with a nominal frequency of 1.5 MHz. This provides a degree of synchronization sufficient to read smart card information into a host PC but, as this approach is directed to a smart card reader, inter-device synchronization is not addressed.

WO 2007/092997 (Foster et al.) discloses a synchronized USB device that allows the generation of accurate clock frequencies on board the USB device regardless of the accuracy of the clock in the Host PC. The USB SOF packet is decoded by the USB device, and treated as a clock carrier signal instead of acting as a clock reference.

The carrier signal, once decoded from the USB traffic, is combined with a scaling factor to generate synchronization information and hence to synthesize a local clock signal with precise control of the clock frequency. In this way, the frequency of the local clock signal can be more accurate than the somewhat ambiguous frequency of the carrier signal.

This arrangement is said to be able to produce a local clock signal to arbitrarily high frequencies, such as a clock frequency of tens of megahertz, and thus to ensure that the local clock of each device connected to a given USB is synchronized in frequency. U.S. application Ser. No. 10/620,769 also teaches a method and apparatus to further synchronize multiple local clocks in phase by measurement of signal propagation time from the host to each device and provision of clock phase compensation on each of the USB devices.

U.S. patent application Ser. No. 12/279,328 (Foster et. al.) teaches synchronisation of the local clocks of a plurality of USB devices to a timebase received from another interface. In one embodiment, a USB device contains a local clock that is synchronised to an externally provided time signature across Ethernet using the IEEE-1588 protocol. In yet another embodiment the USB device's clock is synchronised to a timebase derived from a Global Positioning System (GPS) synchronised clock.

All of the above systems work within the bounds of conventional USB 2.0 and as such are limited in several areas. USB 2.0 is limited in range by the device response timeout. This is the window of time that the USB Host Controller allocates for receipt of a signal from a given USB device in response to a request from said USB Host Controller. The physical reach of USB 2.0 is therefore approximately 25 m.

The USB 3.0 specification was released in November 2008 and is also focussed on consumer applications. The USB 3.0 specification makes significant changes to the architecture of USB. In particular, the background art synchronisation schemes discussed above will not work with the new 5 Gb/s protocol (termed 'SuperSpeed USB') because it does away with the broadcast mechanism for SOF packets.

USB 3.0 defines two parallel and independent USB busses on the same connection cable. Firstly, the USB 2.0 bus remains unchanged (for backward compatibility) and offers Low Speed (1.5 Mb/s), Full Speed (12 Mb/s) and High Speed (480 Mb/s) protocols. The second bus—for 5 Gb/s traffic—provides the SuperSpeed USB. These busses operate independently, except that operation of the busses to a given USB device is mutually exclusive. That is, if a SuperSpeed connection is possible, then the USB 2.0 bus in disconnected to that device.

The dual-bus architecture of USB 3.0 is depicted schematically at 10 in FIG. 1. Personal Computer 12, containing USB Host Controller 14, is connected to USB 3.0 Hub 16 by first USB 3.0-compliant cable 18; USB 3.0 device 20 is connected to a downstream port 22 of USB 3.0 Hub 16 by second USB 3.0-compliant cable 24.

USB Host Controller 14 contains both a USB 2.0 Host 26 and a SuperSpeed Host 28. These two hosts 26, 28 are independent of one another, and each host 26, 28 is capable of connecting up to 127 devices (including hubs). USB 3.0-compliant cables are compound cables, containing a USB 2.0-compliant cable and a series of shielded conductors capable of transmitting SuperSpeed signals. Hence, USB 3.0-compliant cable 18 comprises USB 2.0-compliant cable 30 and shielded conductors 32.

USB 3.0 Hub 16 contains both a USB 2.0 Hub function 34 and a SuperSpeed Hub function 36, each connected directly to its respective Host 26, 28 by compound cable 18. USB 3.0 device 20 contains both a USB 2.0 device function 38 and a SuperSpeed device function 40, each connected back to its respective hub function 34, 36 of USB 3.0 Hub 16 by compound cable 24.

At enumeration of USB 3.0 device 20, SuperSpeed Host 28 checks for the presence of a SuperSpeed device function (40). If a SuperSpeed device is found, then a connection is established. If a SuperSpeed device is not found (as in the case where only a USB 2.0 device is connected to port 22), then the USB 2.0 Host 26 checks for the presence of a USB 2.0 device function (38) at device 20. Once the Host Controller 14 determines which device function is connected, it tells the USB 3.0 Hub 16 to only enable communication for downstream port 22 corresponding to whether the USB 2.0 device function 38 or SuperSpeed device function 40 is attached. This means that only one of the two parallel busses is in operation at any one time to an end device such as USB 3.0 device 20.

Furthermore, SuperSpeed USB has a different architecture from that of the USB 2.0 bus. Very high speed communication systems consume large amounts of power owing to high bit rates. A design requirement of SuperSpeed USB was lower power consumption, to extend the battery life of user devices. This has resulted in a change from the previous broadcast design of the USB 2.0: SuperSpeed is not a broadcast bus, but rather directs communication packets to a specific node in the system and shuts down communication on idle links.

This significantly affects any extension of the synchronisation schemes of, for example, U.S. patent application Ser. No. 12/279,328, whose method and apparatus for synchronising devices is based on a broadcast clock carrier signal that is delivered to each device on the bus, which is unsuitable in SuperSpeed USB.

A SuperSpeed Hub function acts as a device to the host (or upstream port) and as a host to the device (or downstream port). This means that the SuperSpeed Hub function acts to buffer and schedule transactions on its downstream ports rather than merely acting as a repeater. Similarly, the SuperSpeed Hub function does so with scheduling transmissions on the upstream port. A heavily burdened Hub function can therefore add significant non-deterministic delays in packet transmission through the system. This also precludes the use of USB 2.0 synchronisation schemes such as that of U.S. patent application Ser. No. 12/279,328 from operating on SuperSpeed USB.

The crude Isochronous synchronisation of USB 2.0 has been significantly improved in the USB 3.0 specification. Opening an Isochronous communication pipe between a Host Controller and a USB device guarantees a fixed bandwidth allocation in each Service Interval for the communication pipe. The Isochronous Protocol of USB 3.0 contains a so-called Isochronous Timestamp Packet (ITP), which is sent at somewhat regular intervals to each Isochronous Endpoint and which contains a timestamp of the beginning of ITP transmission by the USB Host Physical Layer (Phy) in the time domain of the Host Controller. The Isochronous Timestamp Packet is accurate to about 25 ns. SuperSpeed USB shuts down idle links to conserve power, but links must be active in order to receive an Isochronous Timestamp Packet. The Host Controller must therefore guarantee that all links to a device are in full active mode (termed power state U0) before transmission of the Isochronous Timestamp Packet.

Unfortunately the Isochronous Timestamp packet can be delayed in propagation down the USB network. USB 3.0 also does not provide a way of determining the propagation time of packets in SuperSpeed USB and hence no way of accurately knowing the phase relationship between time domains on different USB devices. Phase differences of several hundred nanoseconds are expected to be a best case scenario with SuperSpeed USB making it impractical for instrumentation or other precision timing requirements.

U.S. Pat. No. 5,566,180 (Eidson et al.) discloses a method of synchronising clocks in which a series of devices on a communication network transmit their local time to each other and network propagation time is determined by the ensemble of messages. Further disclosures by Eidson (U.S. Pat. Nos. 6,278,710, 6,665,316, 6,741,952 and 7,251,199) extend this concept but merely work toward a synchronisation scheme in which a constant stream of synchronising messages are transferred between each of the nodes of a distributed instrument network via Ethernet. This continual messaging consumes bandwidth and limits the accuracy of the possible synchronisation to several hundred nano-seconds in a point-to-point arrangement and substantially lower accuracy (typically micro-seconds) in a conventional switched subnet.

It should be understood that the terms 'clock signals' and 'synchronisation' in this disclosure are used to refer to clock signals, trigger signals, delay compensation information and propagation time measurement messages. It should also be understood that a 'notion of time' in this disclosure is used to denote an epoch or 'real time' and can also be used to refer to the combination of a clock signal and an associated epoch.

SUMMARY OF THE INVENTION

It is a general object of the present invention to enable precision synchronisation of a plurality USB devices, up to a predefined maximum, according to the USB3 Specification.

In a first broad aspect, the present invention provides a method of providing high density expansion of a USB network, the method comprising:

attaching a plurality of USB hubs to adjacent slots in a PXI (including a PXI-express) instrumentation chassis;

configuring one of the USB hubs as a primary USB Hub;

connecting an upstream port of the primary USB Hub to a USB network;

configuring a first downstream port of the primary USB Hub to communicate across a first PXI Local Bus to a first adjacent USB Hub of the plurality of USB Hubs other than the primary USB Hub, the first adjacent USB Hub being adjacent to the primary USB Hub;

configuring a plurality of other downstream ports of the primary USB Hub to provide expansion (such as via a front panel) of the primary USB Hub;

connecting an upstream port of the first adjacent USB Hub to the first PXI Local Bus, wherein the first PXI Local Bus is in the direction of the primary USB Hub;

configuring a first downstream port of the first adjacent USB Hub to communicate across a second PXI Local Bus to a second adjacent USB Hub of the plurality of USB Hubs other than the primary USB Hub, the second adjacent USB Hub being adjacent to the first adjacent USB Hub;

configuring a plurality of other downstream ports of the first adjacent USB Hub to provide expansion (such as via a front panel) of the first adjacent USB Hub; and configuring any other of the USB hubs and the first adjacent USB Hub in like manner.

Thus, USB expansion using a PXI local bus is facilitated in a PXI (including PXI-express) instrumentation architecture, wherein a high density of USB expansion ports can be made available from the PXI instrumentation chassis.

Furthermore, this involves utilising the features of the PXI instrumentation chassis to synchronise the operation of said USB network devices to improve their operation. It will be apparent to those skilled in the art that these methods of expansion may be applied to any rack format instrumentation chassis such as, but not limit to VXI, cPCI, VME using an appropriate backplane bus mechanism.

The method may comprise configuring one or more other USB Hubs in the same manner as is configured the first adjacent USB Hub.

In one embodiment, a Host Controller of a USB network (of which the USB Hubs form a part) is contained within the PXI instrumentation chassis. In this embodiment, the USB Host Controller and the USB Hubs are clocked from a common source (to minimise the effect of reclocking jitter in USB signals), preferably in the form of a trigger bus. Preferably also the USB Host Controller is connected to the primary USB Hub across a backplane of the PXI instrumentation chassis backplane (preferably across the PXI Local Bus).

The USB Host Controller may be connected to the primary USB Hub via an external USB3 cable. Also, the USB Host Controller may be external to the PXI instrumentation chassis.

The method may comprise providing a USB Host Controller of the USB network in or on the PXI instrumentation chassis. The primary USB hub may include the USB Host Controller.

In one embodiment, the downstream ports of the USB Hubs utilise differential signalling across the plurality of PXI Local Buses spanning adjacent USB Hubs. Communication across the PXI Local Bus may be in a single channel at maximum USB communication bandwidth. Alternatively, the communication across PXI Local Bus may be deserialized into a plurality of lower speed parallel channels by an upstream USB Hub (of the USB Hubs) for transmission across links of the PXI Local Bus, followed by re-serializing of the downstream ports of each of the plurality of USB Hubs at the upstream port of another of the plurality of USB Hubs adjacent to the respective USB Hub.

According to this aspect, there is also provided an apparatus for providing high density expansion of a USB network, comprising:
a PXI or PXI-express form factor card;
an upstream port for receiving USB signals from a first PXI local bus;
USB hub circuitry;
a downstream USB port for expanding a USB network across a second PXI local bus; and
one or more additional downstream USB ports for expanding the USB network.

The apparatus may further comprise a USB Host Controller connected to an upstream port of the USB hub circuitry.

The USB hub circuitry may be clocked by a local clock that has been syntonised to the timebase of the USB Host Controller.

According to this broad approach, a system is also provided for utilising the PXI Local Bus for expansion of a USB network by passing USB data streams to adjacent devices.

Thus, according to this aspect there is also provided an apparatus for expanding a USB network, comprising:
USB Hub circuitry for communicating toward a Host Controller through an upstream port of a USB Hub and communicating toward USB devices through a plurality of downstream ports of the USB Hub;
circuitry adapted to connect one of the downstream ports to a first PXI Local Bus port available to a PXI card, the PXI card being attached to a PXI backplane; and
circuitry adapted to connect the upstream port to either a front panel connection of the USB Hub or a second PXI Local Bus port;
whereby USB expansion is provided via a PXI Local Bus on the PXI backplane between adjacent PXI-card-based USB Hubs.

The apparatus may further comprise a PXI or PXI-express form factor card.

In particular embodiment, the apparatus is provided as circuitry on a PXI-card-based USB Hub.

The USB Hub circuitry may be clocked by a local clock that has been syntonised to the timebase of the USB Host Controller.

In one embodiment, there is substantially no integer relationship between a clock rate of the USB Hub circuitry and a clock rate of the USB Host Controller According to one embodiment of this aspect, there is provided a USB Hub provided with the apparatus described above.

In a second broad aspect, the present invention provides a method of synchronising a USB Host Controller and a plurality of USB hubs by utilising the architecture of the PXI (or PXI-express) chassis. The PXI chassis form factor provides multiple plug-in-slots in a card cage arrangement. The backplane of the PXI chassis provides a PCI bus, a dedicated clock and trigger bus (the PXI Star Trigger Bus) and a PXI Local Bus for connecting and providing a side band communication channel between adjacent cards.

According to this aspect, therefore, the present invention provides a method for synchronising a plurality of USB Hubs within a PXI (including PXI-express) instrumentation architecture, the method comprising:
attaching a plurality of USB hubs to slots in a PXI instrumentation chassis, the PXI instrumentation chassis including a PXI Star Trigger Bus;
configuring the USB Hubs to receive clocking signals from the PXI Star Trigger Bus via backplane connectors of the PXI instrumentation chassis; and
synchronising respective local clocks of the USB Hubs to the clocking signals provided by the PXI Star Trigger Bus.

Synchronisation of a plurality of USB devices can be compromised by the way that standard USB hubs process and retransmit data from an upstream port to a downstream port. Thus, the present invention provides a method of reducing the jitter in the local clock of a synchronised USB device.

In an embodiment, a USB Host Controller that conforms to the PXI (including PXI-express) form factor is attached to the PXI instrumentation chassis, and the method includes synchronising a local clock of the USB Host Controller to the clocking signals provided by the PXI Star Trigger Bus. In this way, both the USB data stream bit rate, derived from the USB Host Controller's local clock, and USB Hub re-clocking rate share a common source of time.

Thus, this method allows synchronising of a USB Host Controller and a plurality of USB hubs by utilising the architecture of the PXI (or PXI-express) chassis. The PXI chassis form factor provides multiple plug-in-slots in a card cage arrangement, and the backplane of the PXI chassis provides a PCI bus, a dedicated clock and trigger bus, the PXI Star Trigger Bus, and a PXI Local Bus for connecting and providing a side band communication channel between adjacent cards.

In one embodiment, the local clocks are frequency-locked (or syntonised) to a reference clock signal provided by the PXI Star Trigger Bus. The local clocks may be locked to a desired frequency other than the reference clock signal provided by the PXI Star Trigger Bus. Preferably the plurality of local clocks are phase-aligned, or synchronised, to a reference trigger signal provided by the PXI Star Trigger Bus.

The USB Hub re-clocking rate is preferably synchronised to be substantially an integer multiple of the bit rate of the USB data stream (in order to over-clock the sampling and retransmission of the USB data stream). In this way there is a constant phase relationship between the bit rate of the USB data stream and the plurality of clocks used to retransmit the USB data stream, to minimise jitter in retransmission of the USB data stream by the plurality of USB Hubs.

In a third broad aspect, the present invention provides a method of reducing clocking induced jitter in the local clocks of a plurality of USB devices attached at various points within a USB network, the method comprising:

attaching a plurality of USB hubs to slots in a PXI instrumentation chassis, the PXI instrumentation chassis provided with a PXI Star Trigger Bus;

configuring the USB Hubs to receive clocking signals from the PXI Star Trigger Bus via backplane connectors of the PXI instrumentation chassis; and synchronising respective local clocks of the USB Hubs to the clocking signals provided by the PXI Star Trigger Bus;

attaching a plurality of USB devices at a plurality of points within the USB network;

clocking USB Hub Functions within each of the USB Hubs with the local clocks;

wherein a constant phase relationship is maintained between USB data signals and the USB Hub clocking at each level of the network.

In one embodiment, there is substantially no integer relationship between respective clock rates of the USB Hubs and a clock rate of the USB Host Controller It should be noted that all the various features of each of the above aspects of the invention can be combined as suitable and desired.

Furthermore, it should be noted that the invention also provides apparatuses and systems arranged to perform each of the methods of the invention described above.

In addition, apparatuses according to the invention can be embodied in various ways. For example, such devices could be constructed in the form of multiple components on a printed circuit or printed wiring board, on a ceramic substrate or at the semiconductor level, that is, as a single silicon (or other semiconductor material) chip.

BRIEF DESCRIPTION OF THE DRAWINGS

In order that the present invention may be more clearly ascertained, embodiments will now be described, by way of example, with reference to the accompanying drawing, in which.

DETAILED DESCRIPTION OF THE INVENTION

Figure 1:
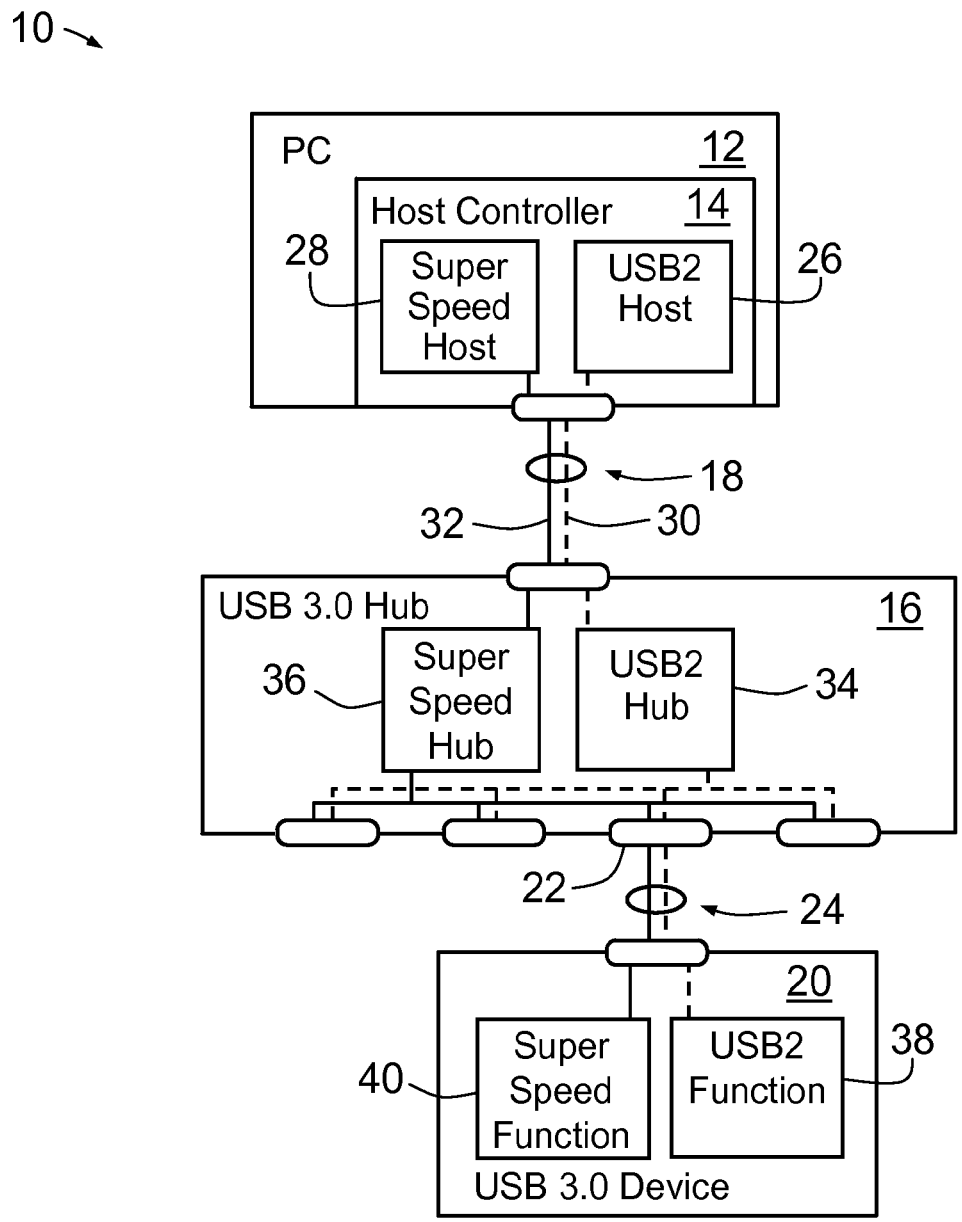
FIG. 1 is a schematic diagram of the dual-bus architecture of USB3 according to the background art.
Figure 2:
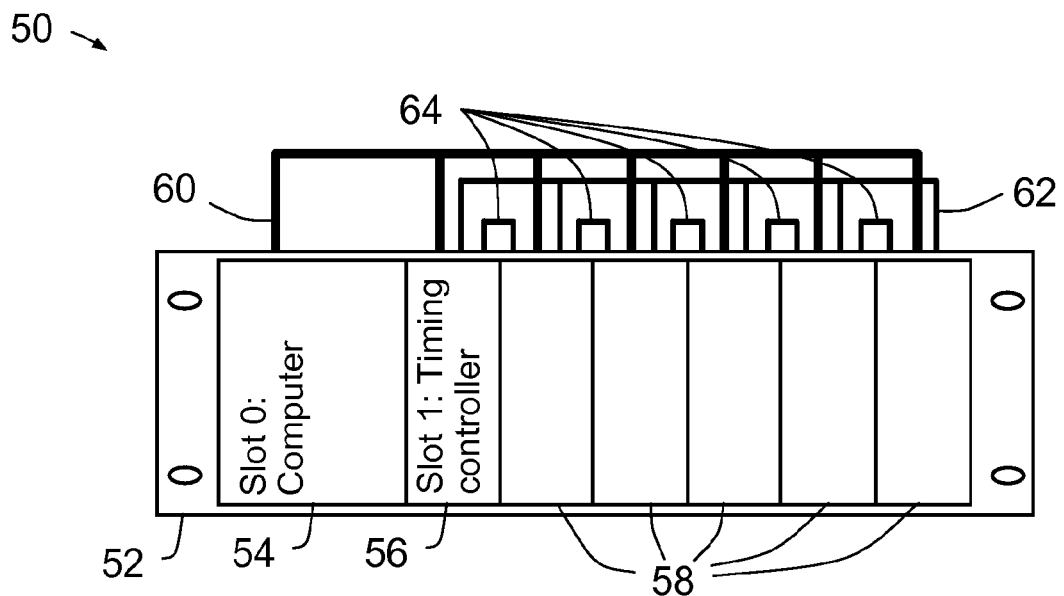
FIG. 2 is a schematic representation of a background art PXI Chassis.

FIG. 2 is a schematic representation of the architecture of a PXI instrumentation chassis 50 according to the background art. The PXI chassis 52 contains a slot 54 for a computer (viz. slot 0 of chassis 52, which typically houses a rugged embedded PC), a timing controller slot 56 (viz. slot 1 of chassis 52), and a plurality of expansion slots 58. These components are connected by several busses 60, 62, 64 across the backplane (which also provides power to the modules as required).

Main communication is provided across the PCI bus 60. All data is transferred between the embedded computer (connected to slot 0) and attached timing controller (connected to slot 1) and plug-in modules 58 across PCI bus 60. Slot 1 may contain a special timing controller device that provides coordination of the different plug-in modules via delivery of clock and trigger event signals across the backplane's Star Trigger Bus 62. Finally a PXI Local Bus 64 is provided for sideband communication between adjacent modules.

Figure 3:
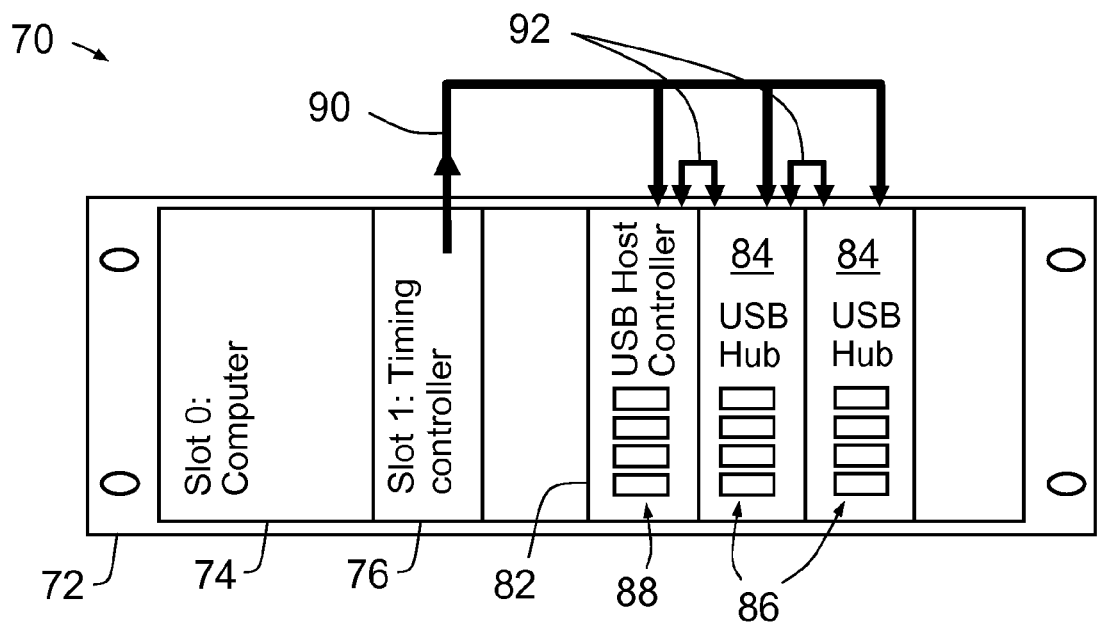
FIG. 3 is a schematic representation of a means for expanding a Synchronous USB within a PXI Chassis according to an embodiment of the present invention.

A system 70 for synchronous USB expansion according to an embodiment of the present invention is shown schematically in FIG. 3. System 70 includes a PXI chassis 72 with a slot 0 controller 74 and a slot 1 timing controller 76.

System 70 also includes a USB Host Controller 82 and two USB Hub devices 84 attached to PXI chassis 72 in adjacent slots of PXI chassis 72. USB Host Controller 82 has circuitry for determining a signal propagation time for signals to propagate to any USB devices attached to Host Controller 82, by any suitable method of the present invention described herein. USB Hub devices 84 each has a plurality of downstream USB expansion ports 86 on their respective front panels. USB Host Controller 82 may optionally have a plurality of downstream USB expansion ports 88.

The timing controller attached at slot 1 (viz. 366) provides timing information to USB Host Controller 82 and USB Hub devices 84 via a PXI Star Trigger Bus 90. These signals preferably include a reference clock and event trigger signals. In this way, each of the USB Host Controller 82 and USB Hub devices 84 can synchronise its clock to the same timebase, derived from the timing controller 76. This reduces the likelihood of clock jitter between the synchronised USB devices attached to system 70.

Furthermore USB Host Controller 82 and USB Hub devices 84 are daisy chained using a PXI Local Bus 92, which connects adjacent modules providing a sideband communication channel between adjacent modules.

It should be noted that the technique employed in this embodiment is also applicable to PXI-express. PXI-express is an evolution of PXI in which the PCI bus (cf. PCI bus 60 of FIG. 2) has been upgraded to a PCI-express bus, but is otherwise comparable to PXI.

It will also be apparent to those skilled in the art that a plurality of USB Host Controllers 82 can be used in PXI Chassis 72, each arranged to receive synchronisation signals from PXI Star Trigger Bus 90. In this way a plurality of USB networks can be synchronised together and to the notion of time of PXI Chassis 72.

Figure 4:
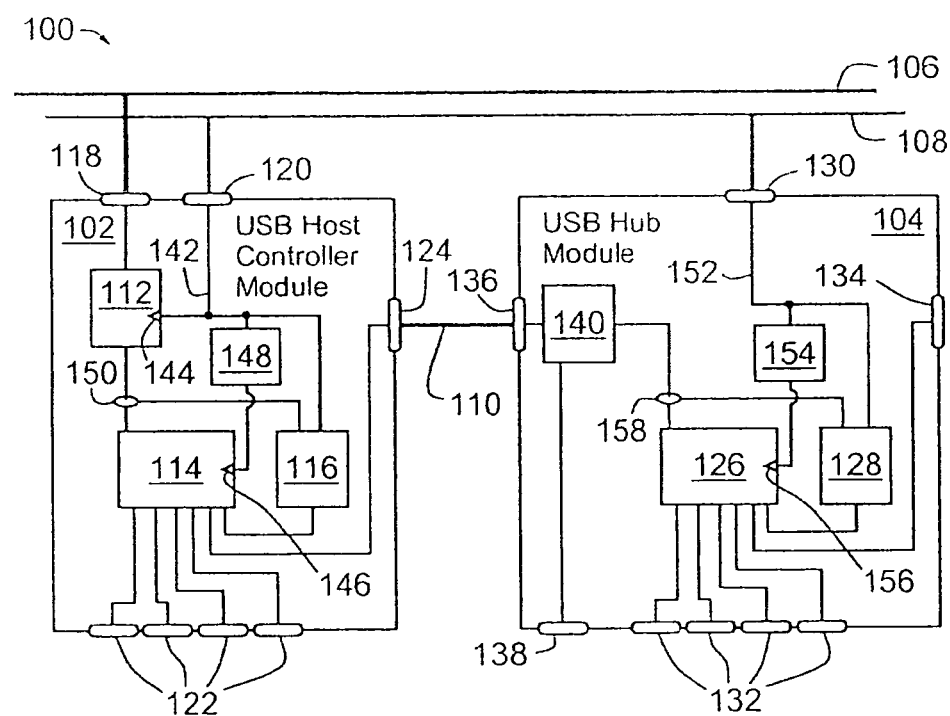
FIG. 4 is a schematic representation of an apparatus for expanding a Synchronous USB within a PXI Chassis according to an embodiment of the present invention.

FIG. 4 is a schematic representation of an apparatus 100 for expanding a synchronous USB according to another embodiment of the present invention. Apparatus 100 includes a USB Host Controller Module 102 and USB Hub Module 104 attached to adjacent slots of a PXI chassis, namely by PCI Backplane 106 and PXI Star Trigger Bus 108. Furthermore, as USB Host Controller Module 102 and USB Hub Module 104 are attached to adjacent slots, they may be connected via an intermediate PXI Local Bus 110.

USB Host Controller Module 102 has a USB Host Controller Function 112, a USB Hub Function 114 for providing expansion of the USB to multiple downstream ports, and a USB Device Function 116 for monitoring USB data streams. USB Host Controller Module 102 is attached to the PXI Chassis' PCI Bus 106 via a first connector 118, to the PXI Chassis' PXI Star Trigger bus 108 via a second connector 120, to downstream USB Hubs and devices via a plurality of Expansion Ports 122 and to adjacent USB Hub Module 104 via PXI Local Bus 110 through a third connector 124.

USB Hub Module 104 has a USB Hub Function 126 for providing expansion of the USB to multiple downstream ports and a USB Device Function 128 for monitoring USB data streams. USB Hub Module 104 is attached to the PXI Chassis' PXI Star Trigger bus 108 via a first connector 130, to downstream USB Hubs and devices through a plurality of Expansion Ports 132 and further expansion is possible via another adjacent USB Hub Module (not shown) using a downstream PXI Local Bus (not shown) through a second connector 134. USB Hub Module 104 receives upstream communication from either the upstream PXI Local Bus 110 through a third connector 136 or via a front panel upstream connector 138. A multiplexer 140 may also be used to ensure only one upstream connection is possible for a given USB Hub Module 104.

According to this embodiment, USB Host Controller Function 112 of USB Host Controller Module 102 is clocked by clock and timing signals received from PXI Star Trigger Bus 108 via second connector 120. A clock signal 142 is provided to both a Clock Input 144 of USB Host Controller Function 112 and a Clock Input 146 of USB Hub Function 114 to ensure that they operate synchronously and therefore minimise reclocking induced jitter. (According to this embodiment, element 148 simply passes the clock signal through to USB Hub function 134.)

According to a variation of this embodiment, element 148 is a phase-locked-loop (PLL) that receives clock signal 142 and regenerates another clock signal of slightly different frequency. This shifts the beat frequency of the two Clock Inputs 144, 146 (of USB Host Controller Function 112 and of USB Hub Function 114 respectively) to a higher known frequency that can be effectively filtered, thereby reducing clocking jitter between devices.

USB Device Function 116 of USB Host Controller Module 102 monitors USB data traffic at detection point 150 to determine the propagation time of signals transmitted by USB Host Controller Function 112 from detection point 150 to each attached downstream USB device, according to any of the approaches of the present invention described herein. USB Device Function 116 may also use clock signals 142 (derived from PXI Star Trigger Bus 108), to determine propagation times using either a SuperSpeed or non-SuperSpeed synchronisation channel.

USB Hub Module 104 receives clock signals 152 from said PXI Star Trigger Bus 108 via first connector 130. Clock signals 152 are used as the clock input 156 for USB Hub Function 126 to re-clock USB data signals upstream and downstream on the USB. Clock signals 152 are synchronous with clock signals 142 at USB Host Controller Module 102 owing to being derived from the common PXI Star Trigger Bus 108. In this way, reclocking induced jitter is minimised according to this embodiment of the present invention. (Element 154 simply passes the clock signal 152 through to USB Hub function 126.)

According to a variation of this embodiment, element 154 is a phase-locked-loop (PLL) that receives clock signal 152 and regenerates another clock signal of slightly different frequency. This shifts the beat frequency of the clock signals at clock inputs 146 (of USB Hub Function 114) and 156 of (USB Hub Function 126) to a higher known frequency that can be effectively filtered, thereby reducing clocking jitter between devices. Knowledge of the frequency of clock signal at clock input 146 allows the clock signal at clock input 156 to be adjusted so as to minimise any possible beating effect.

USB Device Function 128 monitors USB data traffic at detection point 158 to determine propagation time of signals transmitted by USB Host Controller Function 112 (of USB Host Controller Module 102) from detection point 158 to each of attached downstream USB devices, according to any of the techniques of the present invention described herein. USB Device Function 128 may also use clock signals 152 (derived from PXI Star Trigger Bus 108), to determine such propagation times.

Apparatus 100 may use a variety of methods to determine the total signal propagation time to each device from the top level (detection point 150) and hence the relative propagation times to attached USB devices. In one variation of this embodiment, all propagation times are measured by USB Device Function 116 of USB Host Controller Module 102. In another variation, each of USB Host Controller Module 102 and USB Hub Module 104 measures the propagation time to USB devices connected directly to their respective downstream ports 122 or 132, while offsets (i.e. time for propagation from detection point 150 to detection point 158) is determined by reference to the common clocking signals 142 and 152 at each hub layer (USB Host Controller Module 102 and USB Hub Module 104) respectively.

Furthermore, USB Host Controller 102 may also be attached to the Slot 1 PXI timing controller slot and contain additional circuitry (not shown) to control the timing of multiple attached modules by generating precise timing signals onto PXI Star Trigger Bus 108 through second connector 120. In this embodiment, a local clock source (not shown) is provided in USB Host Controller Module 102 to provide reference clock signals 142, which may be delivered to PXI Star Trigger Bus 108 via second connector 120.

Modifications within the scope of the invention may be readily effected by those skilled in the art. It is to be understood, therefore, that this invention is not limited to the particular embodiments described by way of example hereinabove and that combinations of the various embodiments described herein are readily apparent to those skilled in the art.

In the preceding description of the invention and in the claims that follow, except where the context requires otherwise owing to express language or necessary implication, the expression "Host Controller" embraces all forms of USB Host Controller, including standard USB Host controllers, USB-on-the-go Host Controllers and wireless USB Host Controllers.

In the preceding description of the invention and in the claims that follow, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to background art is not intended to imply that such background art forms or formed a part of the common general knowledge in any country.

The invention claimed is:

1. A method of providing expansion of a USB network, the method comprising:

attaching a plurality of USB hubs to adjacent slots in a PXI instrumentation chassis;

configuring one of said USB hubs as a primary USB Hub;

connecting an upstream port of said primary USB Hub to a USB network;

configuring a first downstream port of said primary USB Hub to communicate across a first PXI Local Bus to a first adjacent USB Hub of said plurality of USB Hubs other than said primary USB Hub, said first adjacent USB Hub being adjacent to said primary USB Hub;

configuring a plurality of other downstream ports of said primary USB Hub to provide expansion of said primary USB Hub;

connecting an upstream port of said first adjacent USB Hub to said first PXI Local Bus, wherein said first PXI Local Bus is in the direction of said primary USB Hub; and configuring a plurality of other downstream ports of said first adjacent USB Hub to provide expansion of the first adjacent USB Hub.

2. A method as claimed in claim 1, wherein there are three or more USB hubs attached to adjacent slots in the PXI instrumentation chassis, the method further comprising:
configuring a first downstream port of said first adjacent USB Hub to communicate across a second PXI Local Bus to a second adjacent USB Hub of said plurality of USB Hubs other than said primary USB Hub, said second adjacent USB Hub being adjacent to said first adjacent USB Hub; and
configuring any other of said USB hubs in a like manner.

3. A method as claimed in claim 1, including providing a USB Host Controller of said USB network in or on said PXI instrumentation chassis.

4. A method as claimed in claim 3, wherein said primary USB hub includes said USB Host Controller.

5. A method as claimed claim 1, wherein said downstream ports of said plurality of USB Hubs utilise differential signalling across said plurality of PXI Local Buses spanning adjacent said USB Hubs.

6. A method as claimed in claim 1, including deserializing said downstream ports of said plurality of USB Hubs into a plurality of lower speed signal channels for transmission across links of said PXI Local Bus and re-serializing said downstream ports of each of said plurality of USB Hubs at said upstream port of another of said plurality of USB Hubs adjacent to said respective USB Hub.

7. A method as claimed in claim 1, further comprising:
configuring said USB Hubs attached to adjacent slots in the PXI instrumentation chassis to receive clocking signals from a PXI Star Trigger Bus via backplane connectors of the PXI instrumentation chassis; and
synchronising respective local clocks of the USB Hubs to said clocking signals provided by the PXI Star Trigger Bus.

8. A method as claimed in claim 7, further comprising:
attaching a plurality of USB devices at a plurality of points within the USB network;
clocking USB Hub Functions within each of said USB Hubs with said local clocks;
wherein a constant phase relationship is maintained between USB data signals and said USB Hub clocking at each level of said network.

9. A method as claimed in claim 8, wherein there is substantially no integer relationship between respective clock rates of said USB Hubs and a clock rate of said USB Host Controller.

10. A method as claimed claim 1, further comprising
attaching a USB Host Controller with a local clock to the PXI instrumentation chassis;
synchronising the local clock of the USB Host Controller to a PXI Trigger Bus or PXI Star Trigger Bus of the PXI instrumentation chassis;
synchronising a notion of real time of the USB Host Controller to predefined event signals derived from the PXI Trigger Bus or PXI Star Trigger Bus; and
synchronising a plurality of USB devices at respective attachment points within the USB network to a timebase and the notion of real time of the USB Host Controller.

11. A method as claimed in claim 10, wherein synchronisation of said notion of real time of said USB Host Controller includes phase compensation for USB signal propagation time.

12. An apparatus for providing expansion of a USB network, comprising:
a PXI or PXI-express form factor card containing USB hub circuitry, the USB hub circuitry including:
an upstream port for receiving USB signals from either a first PXI Local Bus or a front panel connection of a USB Hub;
a downstream USB port for expanding a USB network across a second PXI Local Bus; and
one or more additional downstream USB ports for expanding said USB network.

13. An apparatus as claimed in claim 12, further comprising a USB Host Controller, wherein said USB Host Controller is connected to an upstream port of said USB hub circuitry.

14. An apparatus as claimed in claim 13, wherein said USB hub circuitry is clocked by a local clock that has been synchronized to a timebase of the USB Host Controller.

15. An apparatus as claimed in claim 12, wherein:
the PXI or PXI-express form factor card is attached to a PXI backplane.

16. An apparatus as claimed in claim 13, wherein there is substantially no integer relationship between a clock rate of said USB Hub circuitry and a clock rate of said USB Host Controller.

17. A system comprising a PXI instrumentation chassis and a plurality of apparatus as claimed in claim 12 attached to adjacent slots in the PXI instrumentation chassis.

* * * * *